(12) United States Patent
Brotz

(10) Patent No.: US 6,474,065 B1
(45) Date of Patent: Nov. 5, 2002

(54) MULTIJUNCTION THERMOELECTRIC ACTUATOR EMPLOYING ALTERNATING ELECTRICALLY CONDUCTING MATERIAL STRIPS

(76) Inventor: Gregory R. Brotz, P.O. Box 1322, Sheboygan, WI (US) 53081

( * ) Notice: Subject to any disclaimer, the term of this patent is extended or adjusted under 35 U.S.C. 154(b) by 0 days.

(21) Appl. No.: 09/960,913

(22) Filed: Sep. 24, 2001

(51) Int. Cl.$^7$ .......................... H02N 10/00; F01B 29/10
(52) U.S. Cl. ......................................... 60/528; 310/307
(58) Field of Search .......................... 60/527, 528, 306, 60/307, 117

(56) References Cited

U.S. PATENT DOCUMENTS 3,203,166 A * 8/1965 Flanagan
5,588,295 A * 12/1996 Brotz .......................... 60/528
6,161,382 A * 12/2000 Brotz .......................... 60/528

* cited by examiner

*Primary Examiner*—Hoang Nguyen
(74) *Attorney, Agent, or Firm*—William Nitkin

(57) ABSTRACT

A multijunction thermoelectric actuator comprising a composite of a plurality of serially connected alternating electrically conducting material strips, P and N type semiconductors, for example, which actuator is operated by the passage of an electrical current across the composite and the connections or junctions of such strips. Depending upon the direction of flow of the current, a cooling effect takes place on one side of the composite or the other, and simultaneously a heating effect takes place on the other side causing the composite to bend toward the heated side. The strips can be constructed so as to overlap the adjacent strips and a programmable power supply can be used to provide different levels of electrical power at various positions along the composite yielding complex and controllable bending patterns of the actuator.

11 Claims, 2 Drawing Sheets

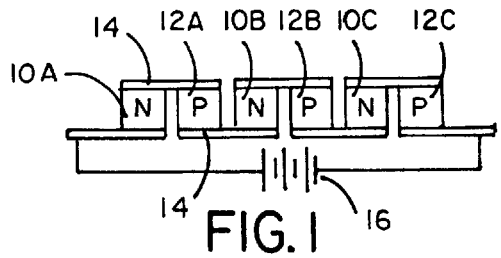
FIG. 1
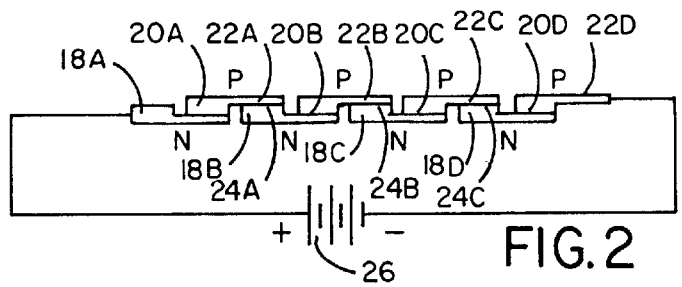
FIG. 2
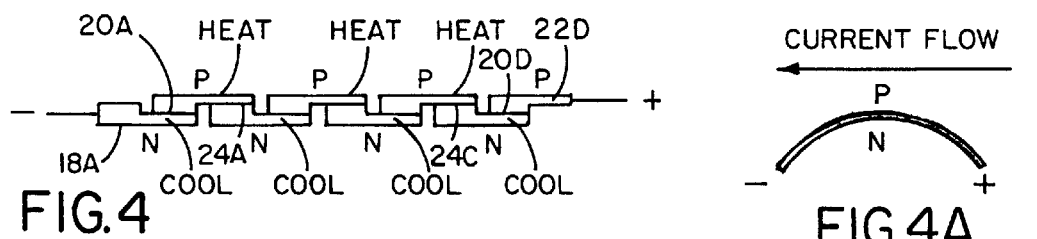
FIG. 4
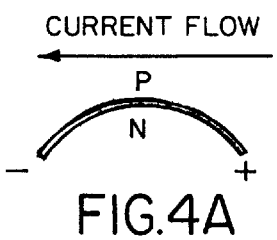
FIG. 4A
FIG. 5A
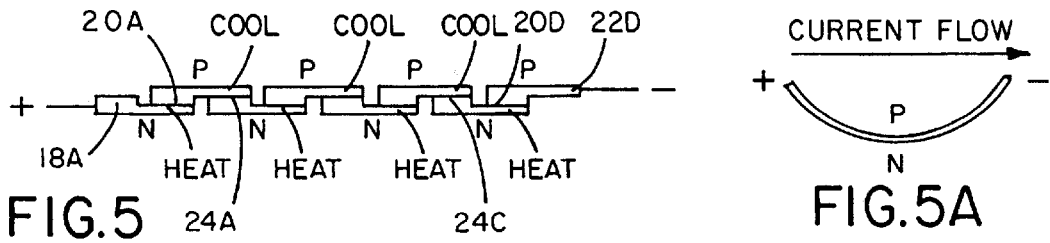
FIG. 5
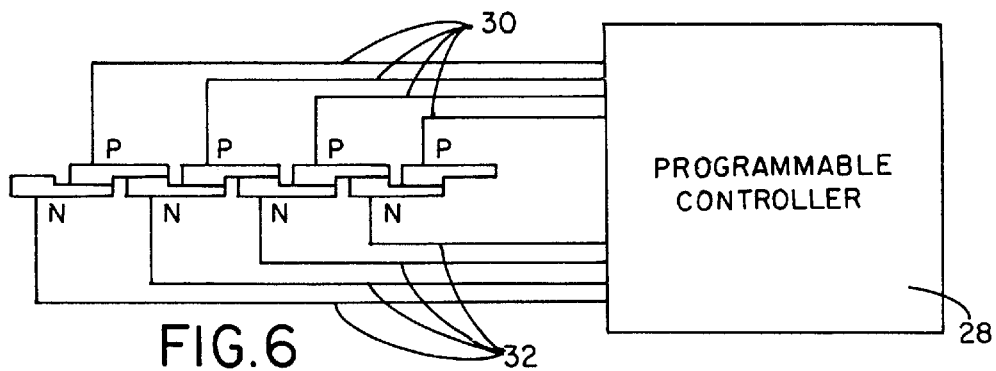
FIG. 6

MULTIJUNCTION THERMOELECTRIC ACTUATOR EMPLOYING ALTERNATING ELECTRICALLY CONDUCTING MATERIAL STRIPS

BACKGROUND OF THE INVENTION

1. Field of the Invention

The invention resides in the field of electrically controlled actuators and more particularly relates to devices composed of a plurality of electrically conductive dissimilar materials having junctions which, upon the passage of electrical current, will be rendered hot or cold depending upon the direction of current flow.

2. Description of the Prior Art

Thermoelectric actuators wherein an electric current is passed through a composite of layered dissimilar materials are known in the prior art. In particular, U.S. Pat. No. 6,161,382 issued to the present inventor discloses a three-layered metallic or semiconductor strip which reacts to the passage of an electrical current across it by generating a relative hot-cold temperature gradient at each material interface as a result of the Peltier effect. The gradient within the composite results in uneven expansion or contraction of the device, depending upon the direction of current flow, causing the device to bend in one direction or the other which bending may be used to do work as a mechanical actuator.

The theoretical background of the Peltier effect and material expansion is treated extensively in the above referenced patent. In summary, electron flow at the junction of two dissimilar conductive materials will result either in a cooling or heating of the junction depending upon the identity of the materials and the direction of current flow. In the prior art, this effect was used to form a multilayered actuator whose size was limited to the area of the sheets forming the composite.

SUMMARY OF THE INVENTION

The invention disclosed herein, while utilizing the same scientific principle, presents an actuator which can be of almost any size and can additionally be varied or controlled at selected positions along its width to achieve complex shapes or profiles. The multijunction thermoelectric actuator of this invention is composed of a series of serially connected, alternating strips of electrically conducting dissimilar materials alternatively joined or having junctions at their upper and lower surfaces. The completed device comprises a sheet of any desired, or practical, dimension of length or width. The total length is the length of the individual strips and the total width is the sum of the widths of the individual strips. Electrical power applied across the width, i.e., from strip to strip will produce a heating effect on one surface and a cooling effect on the opposite surface originating at each connecting junction. The process is reversible such that when the direction of current flow is reversed, the heating and cooling of the surfaces are reversed.

Ideally the strips alternate as to material composition although as long as alternating strips are electrically equivalent with respect to the Peltier effect, they do not have to be identical. P and N type semiconductors are suggested as suitable materials, and the invention will be described in the context of this example.

The unequal expansion and contraction resulting from the temperature gradient between the upper and lower surfaces results in the composite bending toward the heated side. This bending can be used to do work as an actuator, or to modify a surface, for example, for optical transmissions or reflections or to present a varying curved surface for other mechanical purposes, such as an airfoil.

In the most basic embodiment of the invention, the strips are joined by connecting conductors. They can also be constructed so as to overlap to form their own junctions directly without resort to intermediate connectors.

Additionally, as the invention can comprise many serially connected sets of alternating strips, power can be supplied at various points across the composite rather than only at each outer edge. A programmable power supply having a plurality of output points can then be used to alter the shape of the overall sheet in a complex manner rather than a simple bend toward one side or the other.

BRIEF DESCRIPTION OF THE DRAWINGS

FIG. 1 illustrates a schematic representation of the Multifunction Thermoelectric Actuator of this invention.

FIG. 2 illustrates a side view of the preferred embodiment of FIG. 1.

FIG. 4 illustrates an additional view of the embodiment of FIG. 2 showing a first operational condition.

FIG. 4a illustrates a schematic view of the resulting condition of the operation of FIG. 4.

FIG. 5 illustrates an additional view of the embodiment of FIG. 2 showing a second operational condition.

FIG. 5a illustrates a schematic view of the resulting condition of the operation of FIG. 5.

FIG. 6 illustrates a schematic view of an additional embodiment of the invention.

DESCRIPTION OF THE PREFERRED EMBODIMENT(S)

Figure 3:
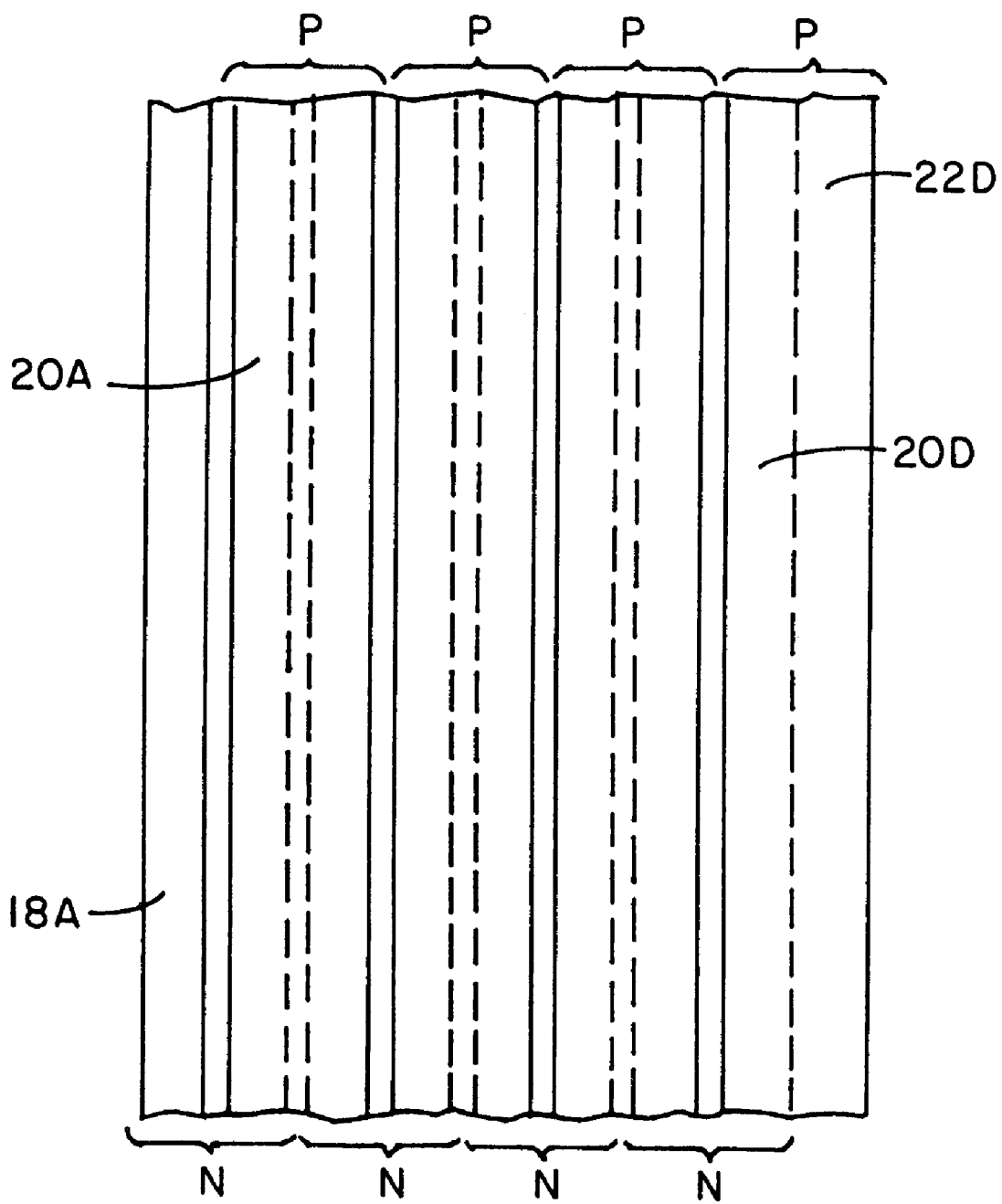
FIG. 3 illustrates a top view of the embodiment of FIG. 2.

FIG. 1 illustrates a schematic representation of the invention in which alternating strips 10a, 10b, and 10c, and 12a, 12b, and 12c, all composed of electrically conducting material, are serially connected by electrical connections 14. The strips are comprised, for example, of P and N type semiconductor materials. Electrical power means 16 is connected across the entire sheet or composite to produce the bending result which will be described below. In the preferred embodiment the separate electrical connections are eliminated by direct contact between the P and N type semiconductor strips.

FIG. 2 illustrates a side or edge view of the construction of the preferred embodiment wherein the strips are configured as overlapping plates. Again, shown as semiconductor material, N type strips 18a, 18b, 18c, and 18d interface directly to form junctions at mutual surfaces 20a, 20b, 20c, and 20d with P type strips 22a, 22b, 22c, and 22d. Similarly, the P type strips interface with the N type strips to form additional junctions 24a, 24b, and 24c.

FIG. 3 is a top view of FIG. 2 illustrating the essentially unlimited length to which the composite can be constructed.

Referring next to FIGS. 4 and 4a, the operation of the invention is described. In accordance with the theory of the Peltier effect, at a cold junction, energy or heat is absorbed by electrons as they pass from a low energy level in the P type semiconductor strip to a higher energy level in the N type semiconductor strip. This process takes place at junctions 20a to 20d. At a hot junction, energy is expelled as electrons move from the high energy material of the N type semiconductor to the lower energy level of the P type semiconductor. This process takes place at junctions 24*a* to 24*c*. Thus, in the figures, the upper surface composed primarily of P type material is heated, and the lower surface composed primarily of N type material is cooled as current flows from plus to minus. The composite therefore bends toward the heated (expanded) N side and away from the cooled (contracted) P side as shown in FIG. 4*a*.

As seen in FIGS. 5 and 5*a*, the process is reversed by reversing the flow of current such that junctions 20*a* to 20*d* are heated and junction 24*a* to 24*c* are cooled. Bending then takes place in the opposite direction toward the N side and away from the P side.

FIG. 6 illustrates a schematic view of an embodiment of the invention in which the composite can be formed into a relatively complex profile. This bending of the structure is accomplished by providing varying levels of power at selected positions across the width of the device. As shown, programmable controller 28 supplies power to selected locations on the P side of the composite through lines 30 and on the N side through lines 32. Different levels of power can then be applied to each site yielding varying degrees of heating and cooling and resulting in varying amounts of expansion and contraction. A profile tailored to a particular use can then be produced, for example, to actuate more than one device with the same composite or to create an airfoil of changing curvature.

Although the present invention has been described with reference to particular embodiments, it will be apparent to those skilled in the art that variations and modifications can be substituted therefor without departing from the principles and spirit of the invention.

I claim:

1. A multijunction thermoelectric actuator comprising in combination a plurality of alternating electrically conducting strips consisting of at least:

a first strip of an electrically conducting material of a first type having an upper and lower surface;

a second strip of an electrically conducting material of a second type having an upper and lower surface, said second strip disposed beside said first strip, the upper surfaces of said first and second strips being electrically connected to form a first junction;

a third strip of an electrically conducting material of a third type electrically equivalent to said first type, said third strip having an upper and lower surface, said third strip disposed beside said second strip, the lower surfaces of said second and third strips being electrically connected to form a second junction; and power supply means connected between said first and third strips whereby current flowing in one direction will cause said upper surfaces of said strips to heat and said lower surfaces of said strips to cool whereby said actuator will bend toward said upper surfaces; and whereby current flowing in the opposite direction will cause said upper surfaces to cool and said lower surfaces to heat whereby said actuator will bend toward said lower surfaces.

2. The device of claim 1 wherein said strips comprise alternating P and N type semiconductors.

3. The device of claim 1 wherein said power supply is of reversible polarity.

4. The device of claim 1 wherein said power supply has a plurality of outputs each connectable to a selected junction of said actuator, each of said outputs capable of supplying a separate selected level of electrical power to said selected junctions.

5. The device of claim 4 further including programmable control means operationally connected to said power supply for establishing and altering said levels of electric power.

6. A multijunction thermoelectric actuator comprising in combination a plurality of alternating electrically conducting strips consisting of at least:

a. A first strip of an electrically conducting material of a first type having an upper and lower surface;

b. A second strip of an electrically conducting material of a second type having an upper and lower surface, said second strip disposed beside said first strip, the upper surface of said first strip and the lower surface of said second strip being electrically connected to form a first junction;

c. A third strip of an electrically conducting material of a third type electrically equivalent to said first type, said third strip having an upper and lower surface, said third strip disposed beside said second strip, the lower surface of said second strip and the upper surface of said third strip being electrically connected to form a second junction; and d. Power supply means connected between said first and third strips whereby current flowing in one direction will cause said upper surfaces to heat and said lower surfaces to cool whereby said actuator will bend toward said upper surface; and whereby current flowing in the opposite direction will cause said upper surfaces to cool and said lower surfaces to heat whereby said actuator will bend toward the lower surface.

7. The device of claim 6 wherein said strips comprise alternating P and N type semiconductors.

8. The device of claim 6 wherein said strips overlap one another to establish mutually interfacing junctions.

9. The device of claim 6 wherein said power supply is of reversible polarity.

10. The device of claim 6 wherein said power supply has a plurality of outputs each connectable to a selected junction of said actuator, each of said outputs capable of supplying a separate selected level of electrical power to said junctions.

11. The device of claim 10 further including programmable control means operationally connected to said power supply for establishing and altering said levels of electric power.

* * * * *